US011162773B2

(12) United States Patent
Salvadé et al.

(10) Patent No.: US 11,162,773 B2
(45) Date of Patent: Nov. 2, 2021

(54) USE OF THE SIDEBANDS OF A MACH-ZEHNDER MODULATOR FOR A FMCW DISTANCE MEASUREMENT

(71) Applicant: HEXAGON TECHNOLOGY CENTER GMBH, Heerbrugg (CH)

(72) Inventors: Yves Salvadé, St-Imier (CH); Sébastien Le Floch, Villeret (CH); Marcel Rohner, Heiden (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 125 days.

(21) Appl. No.: 16/548,596

(22) Filed: Aug. 22, 2019

(65) Prior Publication Data

US 2020/0064116 A1 Feb. 27, 2020

(30) Foreign Application Priority Data

Aug. 22, 2018 (EP) .................... 18190343

(51) Int. Cl.
*G01B 9/02* (2006.01)
*G01S 13/28* (2006.01)
(Continued)

(52) U.S. Cl.
CPC ............ *G01B 9/02003* (2013.01); *G01S 7/41* (2013.01); *G01S 13/282* (2013.01); *G01S 13/505* (2013.01); *G02F 1/21* (2013.01); *G02F 1/212* (2021.01)

(58) Field of Classification Search
CPC ..... G01B 9/02003; G01S 13/282; G01S 7/41; G01S 13/505; G01S 7/4917; G01S 17/34; G01S 7/4911; G02F 1/21; G02F 1/212
See application file for complete search history.

(56) References Cited

U.S. PATENT DOCUMENTS 4,902,125 A * 2/1990 Keene ................. G01S 7/481
356/28.5
6,573,982 B1 6/2003 Pruitt

FOREIGN PATENT DOCUMENTS

| CN | 107505626 A | 12/2017 |
| WO | 2008/037439 A1 | 4/2008 |
| WO | 2010/030884 A2 | 3/2010 |

OTHER PUBLICATIONS

Xu, Y., et al., "Photonic Generation of Dual-Chirp Waveforms With Improved Time-Bandwidth Product," IEEE Photonics Technology Letters, vol. 29, Issue 15, pp. 1253-1256 (Aug. 1, 2017).
(Continued)

*Primary Examiner* — Hwa Andrew Lee
(74) *Attorney, Agent, or Firm* — Maschoff Brennan

(57) ABSTRACT

A distance measuring method and device, wherein a first and a second laser radiation are generated so that the first laser radiation has a first frequency modulation and the second laser radiation has a second frequency modulation, wherein at least in sections a time derivative of the first frequency modulation is different from a time derivative of the second frequency modulation. In accordance with the invention the first and the second laser radiation are generated by modulating a base radiation by means of an electro-optical modulator, so that an output radiation comprising a carrier component and a plurality of sideband components is produced, wherein a first sideband component provides the first laser radiation and a second sideband component provides the second laser radiation.

15 Claims, 3 Drawing Sheets

(51) Int. Cl.
*G01S 7/41* (2006.01)
*G02F 1/21* (2006.01)
*G01S 13/50* (2006.01)

(56) References Cited

OTHER PUBLICATIONS

Extended European Search Report dated Feb. 11, 2019 as received in Application No. 18190343.6.

* cited by examiner

USE OF THE SIDEBANDS OF A MACH-ZEHNDER MODULATOR FOR A FMCW DISTANCE MEASUREMENT

CROSS-REFERENCE TO RELATED APPLICATIONS

This application claims priority to European Patent Application No. 18190343, filed on Aug. 22, 2018. The foregoing patent application is herein incorporated by reference.

FIELD OF INVENTION

The invention relates to a distance measuring method for a distance measurement based on the principle of a modulated continuous wave radar.

BACKGROUND

In the field of electronic distance measurement different principles and methods are known. One approach involves emitting a transmission signal in the form of frequency-modulated electromagnetic radiation towards the target to be measured and subsequently receiving at least a part of the radiation returning from the target as a reception signal, also known as an echo or echo signal. The target to be measured can have both specular, for example, when retro-reflectors are used, and diffuse back-scattering characteristics.

So called FMCW distance measuring devices (FMCW: "Frequency Modulated Continuous Wave radar"), also known as modulated continuous wave radar devices or FMCW radar devices, allow an absolute distance measurement to a target to be measured.

After reception, the echo signal is superimposed/mixed with a local oscillator signal to generate a beat signal, this beat signal having a beat frequency which is correlated with the propagation time of the transmitted signal. Thus, based on the beat signal, the distance to the target can then be derived on the basis of the propagation time.

In a FMCW arrangement, a tunable laser source is used, wherein, in what may be regarded in principle as the simplest embodiment, the variation in the tuning of the optical frequency of the laser source is linear and takes place with a known tuning rate. The reception signal is superimposed with a second signal, which is typically derived from the emitted signal, wherein the resulting beat frequency of the mixing product, the interferogram, is a measure of the distance to the target.

Various variations of this basic form are known in the prior art. For example, a reference interferometer may be used to measure the tuning behaviour of the laser.

The distance measuring devices used to implement these methods typically use a signal generator, which imposes a signal onto a modulatable radiation source. In the optical range, the radiation sources most commonly used are lasers or laser diodes. For emission and reception in the optical range an arrangement of transmitting and receiving lenses are used, wherein for reception a detector for heterodyne mixing may be used, followed by an A/D converter and a digital signal processor.

The change in frequency of the emitted transmission signal represents the scale of the measurement. Depending on the accuracy requirements of the distance measurement, this scale can be verified or determined more precisely by means of an additional measurement. For example, a sufficiently linear continuous tuning of the laser source often requires additional complexity. For this purpose, for example, a part of the emitted radiation may be passed through a reference interferometer with a defined reference length. From the resulting beat product it is possible to infer the temporal change in frequency of the emitted transmission signal on the basis of the known reference length. If the reference length is not known or is unstable, e.g. due to temperature effects, it may be determined using an additional calibration unit, for example a gas cell or a Fabry-Perot-element.

In the most favourable case, the target is at rest relative to the distance meter, i.e. the target has a time-invariant distance to the distance meter. However, with appropriate compensation measures absolute distance measurements are also feasible on moving or vibrating targets.

A radial motion between the target and the distance meter gives rise to Doppler shifts in the beat frequency. However, the Doppler shifts can be compensated, e.g. by a combined measurement of an ascending frequency ramp followed by descending frequency ramp, because the Doppler shifts are the same for both ramps in case of a constant speed of the target, whereas the beat frequencies generated by the ramps have different signs.

However, by using temporally successive opposing ramps, i.e with successive variations of the chirp sign, the usable measuring rate is also halved. In addition, this approach is based on the fact that a constant target speed applies during the traversal period for the two ramps. However, in practice this assumption of a constant speed often does not apply because accelerations and/or vibration of the target during the measurement process, speckle effects, or other effects give rise to non-negligible measuring fluctuations in the distance measurement.

This problem may be eliminated by simultaneously using two opposing frequency ramps, wherein radiation with two radiation components is emitted. For example, the frequency of a first radiation component may be variably tuned "upwards", i.e. to higher frequencies, while at the same time, the frequency of a second radiation component is variably tuned "downwards", i.e. to lower frequencies. Therefore, the requirement for a constant relative radial velocity of the target is limited to a short time window. In addition, by using such so-called opposing chirps, a reduction in the measurement rate is also avoided.

In order to be able to separate the radiation components for measurement purposes, various measures are known in the prior art, e.g. polarization-based, spectral-based, or algorithmic separations.

In the prior art, the two components of the transmission radiation with opposite modulated signal frequencies are typically generated by means of two separate laser sources, for example, by means of two DFB lasers. However, the device complexity necessary for achieving two well defined transmission signals, particularly with respect to a desired tuning accuracy of each of the signals to provide the required well defined frequency difference between the two beams, is often disadvantageous. For example, using corresponding reference interferometers to characterize or monitor the frequency tuning of each beam may be conflicting with reducing technical effort.

DETAILED DESCRIPTION

Therefore, it is an object of some embodiments of the present invention to provide an improved FMCW distance measuring method and a corresponding distance meter.

This object is achieved by realizing the features of the independent claim. Features which further develop the invention in an alternative or advantageous manner are described in the dependent patent claims.

Some embodiments of the invention relate to a FMCW (FMCW: frequency modulated continuous wave radar) distance measuring method comprising the generation of a first and a second laser radiation, wherein the first laser radiation has a first frequency modulation and the second laser radiation has a second frequency modulation, wherein at least in sections a time derivative of the first frequency modulation is different from a time derivative of the second frequency modulation.

In other words, a time section of the first frequency modulation serving for an FMCW evaluation (FMCW: frequency modulated continuous wave radar) corresponds to a time section of the second frequency modulation serving for the FMCW evaluation, in particular the time sections being simultaneous to each other, wherein in each of the respective time sections corresponding to one another for the FMCW evaluation the first and second frequency modulation have different time derivatives.

This is a generalization of the so-called opposing chirp method where the first and second frequency modulation are provided by two opposing frequency ramps, i.e. wherein in at least a section of the second frequency modulation the second frequency modulation has a modulation direction running in opposite direction compared to the modulation direction of the first frequency modulation in a corresponding section of the first frequency modulation, particularly wherein in the section of the second frequency modulation the second frequency modulation is exactly opposite, i.e. same value of the time derivative but different sign, to the first frequency modulation in the corresponding section of the first frequency modulation.

Furthermore, the method comprises the steps: simultaneously emitting to a target at least part of the first laser radiation as a first transmission radiation and at least part of the second laser radiation as a second transmission radiation; receiving at least part of the first transmission radiation returning from the target as first reception radiation and at least part of the second transmission radiation returning from the target as second reception radiation; generating a first and a second mixed signal—the first mixed signal being based on mixing of the first reception radiation with a first local oscillator radiation and the second mixed signal being based on mixing the second reception radiation with a second local oscillator radiation—for a distance measurement in accordance with the principle of a modulated continuous wave radar; and determining at least one distance to the target based on the first and second mixed signal.

For example, at least part of the first laser radiation and at least part of the second laser radiation is passed through a local oscillator stage in order to generate the first and second local oscillator radiation, i.e. the first and second mixed signals each represent a beat signal with a beat frequency that is correlated with the propagation time of the first or the second transmission radiation.

Alternatively, the local oscillator radiation may also be generated by separate radiation sources.

The first and the second mixed signal can be, for example, two separately-generated signals or the first and second mixed signal can be two different signal components of a common mixed signal, generated by a common mixing of the first laser radiation, the second laser radiation, the first received radiation, and the second received radiation.

According to some aspects of the present invention, generating the first and the second laser radiation comprises: generating a base radiation and modulating the base radiation with an electro-optical modulator, wherein the base radiation is passed through the electro-optical modulator and converted into an output radiation. For example, the electro-optical modulator may be an intensity modulator of the Mach-Zehnder type or a phase modulator.

Due to the modulation by the electro-optical modulator, for a given control signal of the electro-optical modulator the output radiation has a carrier signal component with respect to a carrier frequency and a plurality of sideband components with respect to different sideband frequencies. According to the invention, a first sideband component, i.e. an arbitrary sideband of arbitrary order of the output radiation, provides for the first laser radiation and a second sideband component, i.e. an arbitrary sideband of arbitrary order of the output radiation, provides for the second laser radiation, wherein the second sideband component is different from the first sideband component.

It goes without saying that also a first and a second (different) group of sideband components—respectively comprising the first and second sideband component, may respectively provide for the first and second laser radiation.

A particular benefit of the inventive distance measuring method is a reduction of the device complexity for characterizing the frequency modulations of the two laser beams, in that comparatively elaborate optical characterization and monitoring efforts in the context of the FMCW distance measurement are relocated to a characterization and/or stabilization of the electronic control signal of the electro-optical modulator. In particular, with the inventive distance measuring method optical reference components, e.g. corresponding reference interferometers, which are typically required in the prior art to obtain a defined accuracy, can be largely dispensed with. In addition, for example, the long-term stability of a corresponding FMCW distance measuring device can be ensured with simple, in particular electronic, means.

The electro-optical modulator may be controlled by a tunable RF control signal (radio frequency signal) with a variable RF-frequency, e.g. based on a voltage-controlled oscillator or a direct-digital-synthesizer, wherein the frequency of each of the individual side bands or the frequency difference between sidebands can be derived from the set RF-frequency, e.g. wherein the modulator typically provides the sidebands such that differences in sideband frequencies are integer multiples of the RF-frequency.

Furthermore, the RF control signal of the electro-optical modulator may be further characterized in order to increase the accuracy or for monitoring purposes.

For example, in accordance with one embodiment a reference signal is generated based on at least part of the control signal, a sampling of the reference signal is carried out, and the sampling is taken into account when determining the at least one distance to the target.

By way of example, information from the sampling may be used to compensate for a distance measurement error introduced by the electronics and/or information from the sampling may be provided as feedback for stabilizing or controlling the generation of the control signal of the electro-optical modulator.

According to a further embodiment, the control signal is generated based on an output signal of a signal generator, e.g. a voltage controlled oscillator or a direct-digital-synthesizer, wherein from the sampling a comparison parameter is determined by comparing the reference signal with a desired signal, e.g. the desired signal representing or being indicative of a theoretical control signal providing for a desired frequency tuning characteristics, and the output signal is adjusted based on the comparison parameter. Therefore, for example, age-related and/or temperature-induced faults/changes in the electronics can be detected.

For example, in order to simplify the sampling, the reference signal may be transformed to lower frequencies prior to sampling.

Accordingly, in accordance with a further embodiment, the reference signal is generated based on a transformation of at least part of the control signal, wherein the frequency of the reference signal is lower than the frequency of the control signal.

In particular, it goes without saying that further signal processing means, e.g. such as an anti-aliasing filter, known in the art may be applied to further analyse and/or process the reference signal.

In particular, according to a further embodiment, the control signal is configured in such a way that the carrier signal component is suppressed, in particular by impressing a bias signal component on the output signal of the signal generator, e.g. wherein the bias signal component is configured to attenuate the even harmonics of the electro-optical modulator.

Some aspects of the invention also relate to a distance measuring device comprising a transmitter configured for emitting towards a target at least part of a first laser radiation as a first transmission radiation and at least part of a second laser radiation as a second transmission radiation, wherein the first laser radiation has a first frequency modulation, and the second laser radiation has a second frequency modulation, wherein at least in sections a time derivative of the first frequency modulation is different from a time derivative of the second frequency modulation. Furthermore, the distance measuring device comprises: a receiver unit configured for receiving at least part of the first transmission radiation returning from the target as first reception radiation and at least part of the second transmission radiation returning from the target as second reception radiation; a mixer unit configured for generating a first and a second mixed signal—the first mixed signal being based on mixing of the first reception radiation with a first local oscillator radiation and the second mixed signal being based on mixing the second reception radiation with a second local oscillator radiation—for providing a distance measurement in accordance with the principle of a modulated continuous wave radar; and a computing unit configured for determining at least one distance to the target based on the first and second mixed signal.

Typically, the receiver unit and the mixer unit are provided by a single component. However, these units may also be provided by separate components.

It goes without saying that the distance measuring device can also have other generic advantageous properties and components from the prior art for a distance measurement in accordance with the principle of a modulated continuous wave radar.

For example, at least part of the first laser radiation and at least part of the second laser radiation is passed through a local oscillator stage in order to generate the first and second local oscillator radiation, i.e. the first and second mixed signals each represent a beat signal with a beat frequency that is correlated with the propagation time of the first or the second transmission radiation.

Alternatively, the local oscillator radiation may also be generated by separate radiation sources.

According to some aspects of the present invention, the transmitter comprises a laser beam source configured for generating a base radiation and an electro-optical modulator, wherein the transmitter is configured in such a way that the base radiation is passed through the electro-optical modulator and is converted into an output radiation.

Due to the modulation by means of the electro-optical modulator, for a given control signal of the electro-optical modulator the output radiation has a carrier signal component (with respect to a carrier frequency) and a plurality of sideband components (with respect to sideband frequencies), wherein, according to the invention, a first side band component, i.e. an arbitrary sideband of arbitrary order of the output radiation, provides for the first laser radiation and a second (different) side band component, i.e. an arbitrary sideband of arbitrary order of the output radiation, provides for the second laser radiation.

In particular, the distance measuring device according to some embodiments of the invention is configured to carry out the distance measuring method described above.

For example, in one embodiment the distance measuring device may be configured to carry out the FMCW distance measurement based on the so-called opposing chirp principle, i.e. wherein the distance measuring device is configured that in at least a section of the second frequency modulation the second frequency modulation has a modulation direction running in opposite direction compared to the modulation direction of the first frequency modulation in a corresponding section of the first frequency modulation, particularly wherein in the section of the second frequency modulation the second frequency modulation is exactly opposite to the first frequency modulation in the corresponding section of the first frequency modulation.

According to a further embodiment, the distance measuring device has a coupling component, e.g. an RF power coupler, configured for feeding at least a first part of the control signal to a driver channel of the electro-optical modulator and for feeding at least a second part of the control signal to a reference channel. The reference channel has a sampling circuit, e.g. with an analogue-to-digital converter, configured for generating a reference signal based on the second part of the control signal and for carrying out a sampling of the reference signal, wherein the distance measuring device is configured to take the sampling into account for determining the at least one distance to the target.

In a further embodiment the distance measuring device has a signal generator, e.g. a voltage-controlled oscillator or a direct-digital-synthesizer, and is configured for generating the control signal based on an output signal of the signal generator, to determine from the sampling a comparison parameter comparing the reference signal with a desired signal, e.g. the desired signal being indicative of a theoretical signal providing for a desired frequency tuning characteristics of the electro-optical modulator, and to adjust the control signal based on the comparison parameter.

Thus the frequency sweep of the electro-optical modulator can be monitored/controlled, also called linearized, i.e. wherein the comparison parameter is used as feedback to the signal generator input signal in order to provide a frequency tuning of the electro-optical modulator which follows a given/desired course.

In particular, according to a further embodiment, the sampling circuit has a transformation stage, e.g. having a RF-frequency divider, configured for transforming at least a portion of the second part of the control signal to a frequency which is lower than the frequency of the control signal.

Furthermore, in accordance with another embodiment, the distance measuring device is configured to generate the control signal in such a way that the carrier signal component is suppressed, in particular wherein a bias signal component is impressed on the output signal of the signal generator, e.g. wherein the bias signal component is configured to attenuate the even harmonics of the electro-optical modulator.

BRIEF DESCRIPTION OF THE DRAWINGS

The method and distance measuring device according to the invention are described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention. Specifically.

DETAILED DESCRIPTION

Figure 1:
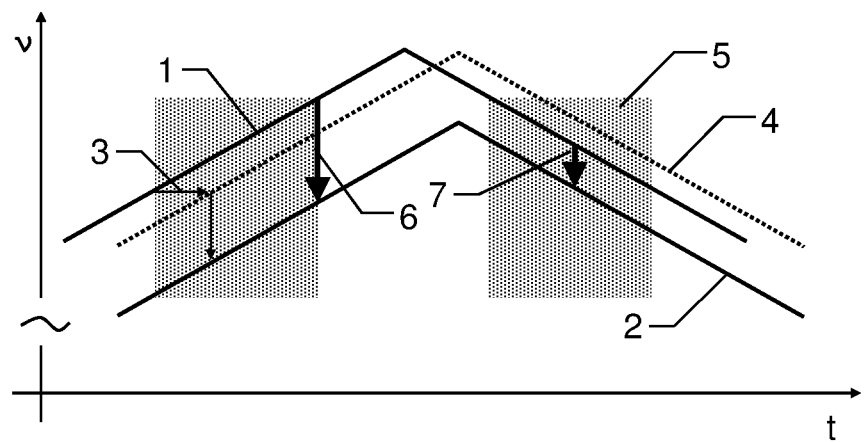
FIG. 1: representation of the time dependence of the transmission and reception frequency of a modulated continuous wave radar with ascending and descending frequency ramp.

FIG. 1 shows a schematic representation of the time dependence of the frequency of the transmission radiation 1 and the reception radiation 2 of a modulated continuous wave radar with ascending and descending frequency ramp, also called an FMCW radar device, which enables an absolute distance measurement to a target to be measured.

Modulated electromagnetic radiation is emitted onto the target to be measured as a transmission signal and at least a portion of the radiation returning from the target is subsequently received as an echo signal. The target to be measured can have both specular and diffuse back-scattering characteristics. After reception, the echo signal is superimposed with a local oscillator signal to generate an interferogram, wherein from the interferogram the propagation time of the transmission signal and therefore the distance to the target can be derived, e.g. via a beat frequency correlated with the propagation time.

The radiation generated by the FMCW distance measuring device is frequency-modulated by a signal generator, e.g. in such a way that in the temporal progression t of the signal frequency v ascending and descending frequency ramps are generated. Typically, both an ascending and a descending frequency ramp are used in order to compensate for Doppler effects, because with only a single, e.g. ascending frequency ramp, measured frequency changes of the beat frequency cannot be uniquely assigned to a distance component or a velocity component of the target or distance measuring device.

During the propagation time 3 of the transmission signal to the target and back the frequency of the transmitter changes. Therefore, without taking into account the Doppler effect, a time-shifted representation 4 of the frequency-modulated transmission frequency 1 would be generated, whereas by taking into account the Doppler effect the time-shifted representation 4 of the frequency-modulated transmission frequency 1 is additionally shifted in frequency direction. The distance measurement is effected with respect to measuring ranges 5 also shown in the figure for the ascending or the descending frequency ramp.

By using an ascending and a descending frequency ramp, e.g. by means of a triangular frequency modulation as shown in the figure, the Doppler frequency can be determined as a measure of a relative radial velocity of the target with respect to the measuring device, i.e. as an independent measurement variable in addition to the distance measurement.

For example, if the target is moving radially away from the distance measuring device, then the frequency of the beat signal corresponding to the ascending ramp 2 may decrease by the Doppler frequency such that the difference frequency component 6 of the ascending ramp, i.e. the difference between the transmission frequency 1 and the reception frequency 2 corresponding to the ascending ramp, is increased. By contrast, the difference frequency component 7 of the descending ramp decreases.

Since at constant relative radial velocity between the target and the measuring device the frequency offset introduced by the Doppler effect is identical for the ascending and the descending ramp, then, given equal values of steepness of the frequency modulation in the ascending and the descending ramp, the mean value of the difference frequencies with respect to ascending and descending ramps is a measure of distance, independently of the relative radial velocity, whereas the sum of the difference frequencies is a measure of the relative radial velocity between the target and the measuring device.

However, a temporal separation between transmitting the ascending and the descending frequency ramp requires that the relative radial velocity is constant during the distance measurement. In practice, however, this assumption is often not met and object vibrations, speckle effects or other effects which can interfere with the interferometric phase, can give rise to non-negligible fluctuations in the measured distance.

Therefore, in prior art often FMCW distance measuring devices with so-called opposing chirp are used, i.e. wherein, for example by means of two laser beams, an ascending and a descending frequency ramp are essentially emitted at the same time. The assumption of a constant relative radial velocity then only needs to be satisfied within a short time window.

In general, it is sufficient to use two frequency modulations, wherein at least in sections a time derivative of the first frequency modulation is different from a time derivative of the second frequency modulation.

Figure 2:
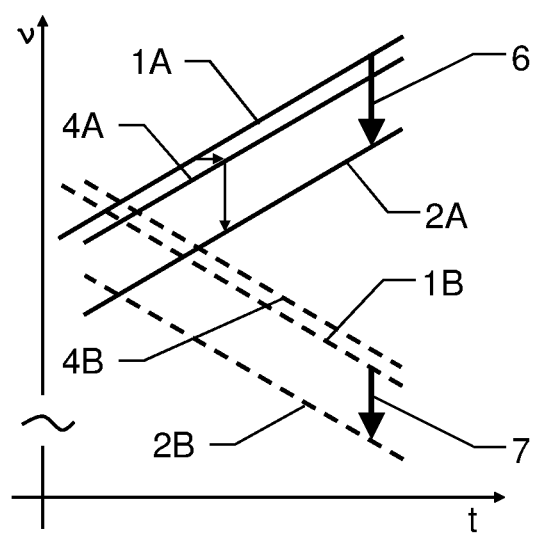
FIG. 2: transmission and reception frequency of a modulated continuous wave radar with opposing chirp.

FIG. 2 shows a schematic representation of the transmission and reception frequency of a modulated continuous wave radar with so-called opposing chirp. In this case the radiation emitted onto a target has two components with different temporal variations of the signal frequency, i.e. opposing frequency ramps 1A,1B.

For example, the radiation components may be emitted as two overlapping laser beams with a phase offset of the opposing chirp of exactly 180°, hence strictly out of phase. The modulation depth of the two laser beams may be different. If both laser beams are emitted via a common lens towards a common target, or received by it, then it is required by measures on receiver side that two reception signals 2A,2B can be separated, respectively assigned to the frequency ramps 1A,1B. For example, in the prior art this is solved by a different polarization of the laser beams.

Again, analogous to FIG. 1, in order to illustrate the principle and the Doppler effect also the time-shifted virtual representations 4A,4B of the oppositely modulated transmission frequencies 1A,1B are shown.

In analogy to using sequential frequency ramps as shown in FIG. 1, in the case of equal steepness of the frequency modulation in the ascending and the descending ramp, the mean value of the difference frequencies 6,7 between transmission and reception frequencies is a distance measure, independently of the radial velocity.

In the prior art, the two laser beams with oppositely modulated transmission frequencies 1A,1B are typically generated by means of two separate modulatable laser sources.

Figure 3:
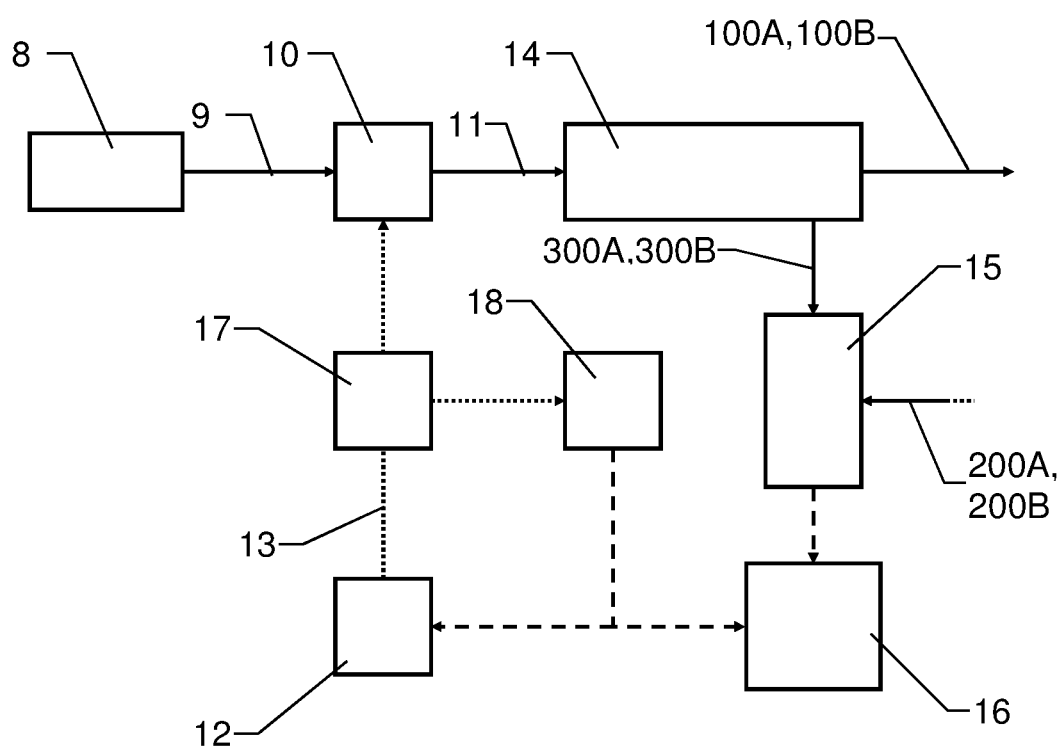
FIG. 3: schematic arrangement of components for a FMCW distance measuring device according to the invention.

FIG. 3 shows a schematic arrangement of the components for a FMCW distance measuring device according to the invention, wherein the two laser beam components are instead generated using the same laser beam source.

For example, the laser distance measuring device according to the invention has a laser beam source 8, which generates a base radiation 9. Furthermore, the distance measuring device has a Mach-Zehnder modulator 10, wherein the base radiation 9 is passed through the Mach-Zehnder modulator 10, and is thus converted into a modulated output radiation 11, wherein the Mach-Zehnder modulator 10 is controlled using an oscillator signal 13 generated by a signal generator 12, e.g. a voltage-controlled oscillator or a direct-digital-synthesizer.

Figure 4:
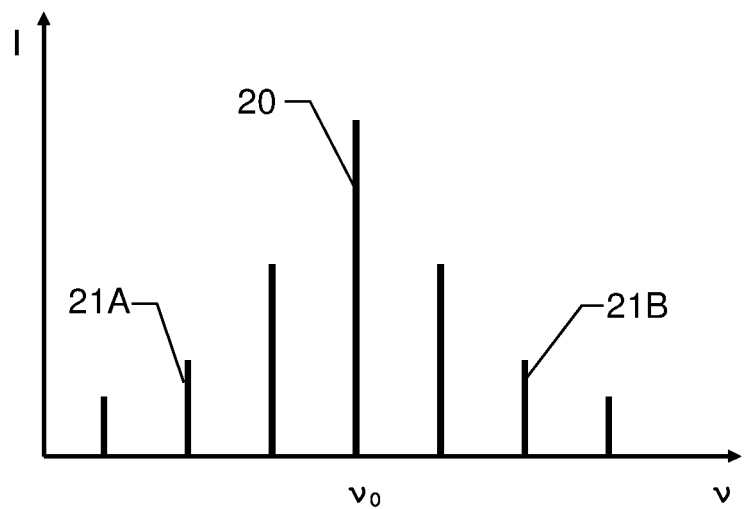
FIG. 4: example frequency distribution of the base radiation modulated with a Mach-Zehnder modulator.

For a given control signal 13 of the Mach-Zehnder modulator 10, the output radiation 11—an example of which is shown in FIG. 4—has a frequency distribution with a carrier signal component 20 with respect to a carrier frequency vo and a plurality of sideband components. The intensity distribution $1(v)$ generated by the carrier signal component 20 and the sidebands is typically symmetrical with respect to the intensity of the carrier signal component 20, which, as showed in the figure, may typically have the greatest intensity I.

According to the invention, a first sideband component 21A provides for the first laser radiation and a different second sideband component 21B provides for the second laser radiation.

For the FMCW distance measurement at least a portion of the output radiation is fed to a delay line 14, so that a first local oscillator radiation 300A corresponding to the first laser radiation and a second local oscillator radiation 300B corresponding to the second laser radiation are generated and fed to a mixer 15. Furthermore, a portion of the first as well as a portion of the second laser radiation are emitted towards the target as a transmission beam comprising a first and a second transmission radiation 100A, 100B, respectively.

Figure 5:
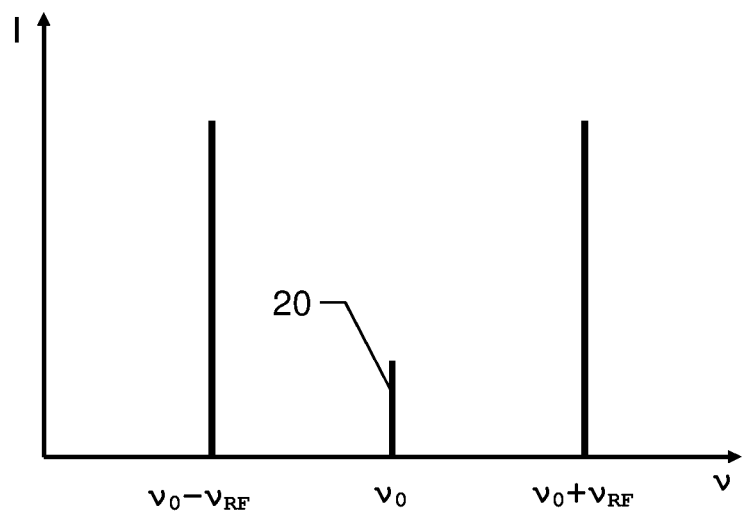
FIG. 5: schematic representation of a suppression of the carrier signal component by means of a bias signal component.

In terms of frequency, the sideband components, as schematically shown in FIG. 5, are arranged symmetrically about the carrier frequency vo as a function of the RF control frequency $v_{RF}$ of the control signal 13 of the Mach-Zehnder modulator 10. The sideband frequencies of the sideband components can thus each be derived from the control signal 13 of the Mach-Zehnder modulator 10.

At least a portion of the first transmission radiation 100A and a portion of the second transmission radiation 100B returning from the target are received by a receiver (not shown) as the first and second reception radiation 200A, 200B, respectively, and the mixer 15 is configured to generate a mixture of the first oscillator radiation 300A with the first reception radiation 200A and/or a mixture of the second oscillator radiation 300B with the second reception radiation 200B. For example, the mixer 15 generates a beat signal with a beat frequency that is correlated with the propagation time of one of the transmitted signals 100A,100B. Based on the beat signal, the computing unit 16 of the distance measuring device can therefore derive a distance to the target.

Particularly when using a direct-digital-synthesizer as signal generator 12, the generated control signal 13 of the electro-optical modulator 10 may already be sufficiently defined in order that the modulator 10 provides a desired well-defined frequency tuning characteristic. In any case, it is a benefit of the inventive distance measuring device that comparatively elaborate optical characterization and monitoring efforts in the context of the FMCW distance measurement can be relocated to a characterization and/or stabilization of the electronic control signal 13, i.e. wherein the control of the Mach-Zehnder modulator 10 is monitored electronically with low device complexity.

For example, part of the control signal 13 is fed via an RF coupler 17 to a sampling circuit 18 with an analogue-to-digital converter ("ADC"), by means of which a sampling of the control signal 13 is performed. In particular, such a sampling enables detection of non-linearities in the generation of the control signal 13 which can be taken into account in a feedback loop for generating the control signal 13 and/or to compensate for a distance measurement error introduced by the electronics.

In addition, a bias signal component may be impressed on the output signal of the signal generator 12, i.e. impressed on the control signal 13 driving the Mach-Zehnder modulator 10, such that the carrier signal 20 generated by the Mach-Zehnder modulator 10 is suppressed. This enables, as shown in FIG. 5, to increase the signal amplitudes of the sidebands 21 relative to the signal amplitude of the carrier signal component 20.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A distance measuring method comprising:
   generating a first laser radiation and a second laser radiation, wherein
      the first laser radiation has a first frequency modulation, and
      the second laser radiation has a second frequency modulation, wherein at least in sections a time derivative of the first frequency modulation is different from a time derivative of the second frequency modulation;
   simultaneously emitting to a target at least part of the first laser radiation as a first transmission radiation and at least part of the second laser radiation as a second transmission radiation;
   receiving at least part of the first transmission radiation returning from the target as first reception radiation and at least part of the second transmission radiation returning from the target as second reception radiation;
   generating a first and a second mixed signal, the first mixed signal being based on mixing of the first reception radiation with a first local oscillator radiation and the second mixed signal being based on mixing the second reception radiation with a second local oscillator radiation, for a distance measurement in accordance with the principle of a modulated continuous wave radar; and determining at least one distance to the target based on the first and second mixed signal, wherein generating the first and the second laser radiation comprises:

generating a base radiation, and modulating the base radiation with an electro-optical modulator, wherein the base radiation is passed through the electro-optical modulator and converted into an output radiation, wherein for a given control signal of the electro-optical modulator the output radiation has a carrier signal component and a plurality of sideband components, the distance measuring method comprising:

generating a reference signal based on at least part of the control signal;

sampling the reference signal; and taking the sampling into account when determining the at least one distance to the target, wherein a first sideband component provides the first laser radiation and a second sideband component provides for the second laser radiation.

2. The distance measuring method according to claim 1, wherein in at least a section of the second frequency modulation the second frequency modulation has a modulation direction running in opposite direction compared to the modulation direction of the first frequency modulation in a corresponding section of the first frequency modulation.

3. The distance measuring method according to claim 1, wherein the control signal is generated based on an output signal of a signal generator, wherein from the sampling a comparison parameter is determined by comparing the reference signal with a desired signal, and the output signal is adjusted based on the comparison parameter.

4. The distance measuring method according to claim 1, wherein the reference signal is generated based on a transformation of at least part of the control signal, wherein the frequency of the reference signal is lower than the frequency of the control signal.

5. The distance measuring method according to claim 1, further comprising:

generating the control signal based on an output signal of a signal generator; and impressing a bias signal component on the output signal of the signal generator such that the carrier signal component is suppressed.

6. The distance measuring method according to claim 1, further comprising:

obtaining information from the sampling of the reference signal; and compensating for a distance measurement error introduced by electronics when determining the the at least one distance to the target.

7. The distance measuring method according to claim 6, further comprising detecting non-linearities in the generation of the control signal.

8. The distance measuring method according to claim 7, further comprising accounting for the detected non-linearities in a feedback loop for generating the control signal.

9. The distance measuring method according to claim 1, further comprising:

obtaining information from the sampling of the reference signal;

detecting non-linearities in the generation of the control signal; and accounting for the detected non-linearities in a feedback loop for generating the control signal.

10. A distance measuring device comprising:

a transmitter configured for emitting towards a target at least part of a first laser radiation as a first transmission radiation and at least part of a second laser radiation as a second transmission radiation, wherein the first laser radiation has a first frequency modulation, and the second laser radiation has a second frequency modulation, wherein at least in sections a time derivative of the first frequency modulation is different from a time derivative of the second frequency modulation;

a receiver unit configured for receiving at least part of the first transmission radiation returning from the target as first reception radiation and at least part of the second transmission radiation returning from the target as second reception radiation;

a mixer unit configured for generating a first and a second mixed signal, the first mixed signal being based on mixing of the first reception radiation with a first local oscillator radiation and the second mixed signal being based on mixing the second reception radiation with a second local oscillator radiation, for providing a distance measurement in accordance with the principle of a modulated continuous wave radar;

a signal generator configured for generating a control signal; and a computing unit configured for determining at least one distance to the target based on the first and second mixed signal, wherein the transmitter comprises:

a laser beam source configured for generating a base radiation, and an electro-optical modulator, wherein the transmitter is configured such that:

the base radiation passes through the electro-optical modulator and is converted into an output radiation, wherein for each control signal of the electro-optical modulator the output radiation has a carrier signal component and a plurality of sideband components, a first sideband component provides the first laser radiation, and a second sideband component provides the second laser radiation, the distance measuring device further comprising:

a coupling component configured for feeding at least a first part of the control signal to a driver channel and for feeding at least a second part of the control signal to a reference channel; and the reference channel has a sampling circuit that is configured for generating a reference signal based on the second part of the control signal and for carrying out a sampling of the reference signal, wherein the computing unit is configured to take the sampling into account for determining the at least one distance to the target.

11. The distance measuring device according to claim 10, wherein the transceiver is configured such that in at least a section of the second frequency modulation the second frequency modulation has a modulation direction in and opposite direction compared to the modulation direction of the first frequency modulation in a corresponding section of the first frequency modulation.

12. The distance measuring device according to claim 10, wherein the signal generator is configured to:
   generate the control signal based on an output signal of the signal generator,
   determine from the sampling a comparison parameter comparing the reference signal with a desired signal, and
   adjust the output signal based on the comparison parameter.

13. The distance measuring device according to claim 10, wherein the sampling circuit has a transformation stage, configured for transforming at least a portion of the second part of the control signal to a frequency which is lower than the frequency of the control signal.

14. The distance measuring device according to claim 10, wherein the signal generator is configured to generate the control signal such that the carrier signal component is suppressed.

15. The distance measuring device according to claim 10, further comprising a feedback loop including the signal generator, coupling component, and sampling circuit, wherein the signal generator is configured to generate an adjusted control signal based on a comparison parameter obtained from a feedback loop comparing the reference signal with a desired signal.

* * * * *